US008693545B2

(12) United States Patent
Kim

(10) Patent No.: US 8,693,545 B2
(45) Date of Patent: Apr. 8, 2014

(54) DISPLAY DEVICE AND IMAGE PROCESSING METHOD THEREOF

(75) Inventor: Jae-Shin Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 396 days.

(21) Appl. No.: 12/982,157

(22) Filed: Dec. 30, 2010

(65) Prior Publication Data

US 2011/0206126 A1 Aug. 25, 2011

(30) Foreign Application Priority Data

Feb. 23, 2010 (KR) ........................ 10-2010-0016390

(51) Int. Cl.
*H04N 5/222* (2006.01)

(52) U.S. Cl.
USPC .................................................... 375/240.16

(58) Field of Classification Search
USPC .................................................... 375/240.16
See application file for complete search history.

(56) References Cited

U.S. PATENT DOCUMENTS

| | | | | |
|---|---|---|---|---|
| 5,706,386 | A * | 1/1998 | Miyazawa | 386/278 |
| 5,960,148 | A * | 9/1999 | Miyazawa | 386/278 |
| 6,507,365 | B1 * | 1/2003 | Nakamura et al. | 348/296 |
| 6,771,243 | B2 * | 8/2004 | Hirohata | 345/89 |
| 7,391,396 | B2 * | 6/2008 | Igarashi | 345/87 |
| 7,956,876 | B2 * | 6/2011 | Shiomi | 345/690 |
| 8,228,427 | B2 * | 7/2012 | Mori et al. | 348/441 |
| 8,311,269 | B2 * | 11/2012 | Iwamura | 382/100 |
| 2002/0097252 | A1 * | 7/2002 | Hirohata | 345/690 |
| 2003/0031253 | A1 * | 2/2003 | Itokawa | 375/240.08 |
| 2006/0045381 | A1 * | 3/2006 | Matsuo et al. | 382/276 |
| 2006/0072664 | A1 * | 4/2006 | Kwon et al. | 375/240.16 |
| 2009/0109290 | A1 * | 4/2009 | Ye et al. | 348/155 |
| 2009/0140964 | A1 * | 6/2009 | Chiang | 345/87 |
| 2009/0180670 | A1 * | 7/2009 | Iwamura | 382/107 |
| 2009/0267962 | A1 * | 10/2009 | Kim et al. | 345/596 |
| 2009/0268089 | A1 * | 10/2009 | Mori et al. | 348/459 |
| 2009/0323809 | A1 * | 12/2009 | Raveendran | 375/240.16 |
| 2011/0109782 | A1 * | 5/2011 | Park et al. | 348/333.01 |
| 2011/0206126 | A1 * | 8/2011 | Kim | 375/240.16 |

FOREIGN PATENT DOCUMENTS

| | | |
|---|---|---|
| KR | 10-2007-0071329 A | 7/2007 |
| KR | 10-2008-0022614 A | 3/2008 |
| KR | 10-2008-0032741 A | 4/2008 |
| KR | 10-2008-0062808 A | 7/2008 |

OTHER PUBLICATIONS

Korean Notice of Allowance dated Dec. 5, 2011 for Korean Patent Application No. KR 10-2010-0016390 which corresponds to captioned U.S. Appl. No. 12/982,157.

* cited by examiner

*Primary Examiner* — Dave Czekaj
*Assistant Examiner* — Kehinde O Abimbola
(74) *Attorney, Agent, or Firm* — Knobbe, Martens, Olson & Bear LLP

(57) ABSTRACT

A display device and driving method are disclosed. The display device is configured to determine local areas in which motion blur is expected. Black data is inserted into the image data in the areas to compensate and reduce the motion blur.

17 Claims, 5 Drawing Sheets

DISPLAY DEVICE AND IMAGE PROCESSING METHOD THEREOF

CROSS-REFERENCE TO RELATED APPLICATIONS

This application claims priority to and the benefit of Korean Patent Application No. 10-2010-0016390 filed in the Korean Intellectual Property Office on Feb. 23, 2010, the entire contents of which are incorporated herein by reference.

BACKGROUND

1. Field

The disclosed technology relates to a display device and an image processing method thereof. More particularly, the technology relates to a high-quality display device with high quality video and high reliability of light emitting elements, and an image processing method.

2. Description of the Related Technology

Various flat display devices having improved attributes as compared to cathode ray tubes (CRT), such as weight and size, have been developed in recent years. Such flat display devices include liquid crystal displays (LCDs), field emission displays (FEDs), plasma display panels (PDPs), and organic light emitting diode (OLED) displays.

OLED displays use organic light emitting diodes (OLEDs) to generate light through recombination of electrons and holes for displaying images. OLED displays have fast response speed, low power consumption, excellent luminous efficiency, luminance, and viewing angle such that it has been favored.

Liquid crystal displays (LCDs) display images by using optical anisotropy and birefringence characteristics of liquid crystal molecules. LCD displays have two substrates on which electric field generating electrodes are formed so that surfaces on which the electrodes are formed face with each other. LCD displays have a liquid crystal material between the two substrates, and change arrangement of the liquid crystal molecules with an electric field generated by applying a voltage to the electrodes to control transmission of light to a transparent substrate, thereby displaying images.

The display devices may be classified as hold type display devices for continuously showing an image for 1 frame and as impulse type display devices for showing an image only during a short scanning time of the 1 frame period.

The organic light emitting diode (OLED) display and the liquid crystal display (LCD) are each hold type display devices, which display images while maintaining the same RGB luminance for the entire frame period.

The hold type of display device generates a motion blur phenomenon because of the holding characteristic.

To solve this problem, a method for reducing the hold time by inserting black data has been proposed, but the method generates flicker and reduces the life-span of the light emitting elements. Also, the method for inserting the black data into the video by determining a still image and video has only limited success in improving the motion blur phenomenon in real video.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One inventive aspect is a display device. The display device includes a frame input unit configured to receive a plurality of consecutive frames of image data, a motion vector extractor configured to calculate a plurality of motion vectors based on a difference between image data of a current frame and a previous frame, and a motion blur determiner configured to determine an area ratio for an area of image data based on the motion vectors. The motion blur detector is also configured to determine that motion blur is expected in the area of image data based on the area ratio. The display device also includes a motion compensator configured to compensate for the expected motion blur in the determined area by inserting black data in the determined area after the current frame data of the determined area.

Another inventive aspect is an image processing method for a display device. The method includes comparing image data of a current frame and image data of a previous frame of a plurality of consecutive frames, calculating a plurality of motion vectors based on a difference between image data of the current frame and the previous frame, and determining an area ratio for image data of an area based on the motion vectors. The method also includes determining that motion blur is expected in the image data of the area based on the area ratio, and compensating for the expected motion blur in the determined area by inserting black data in the determined area after the current frame data of the determined area.

DETAILED DESCRIPTION OF CERTAIN INVENTIVE EMBODIMENTS

Figure 1:
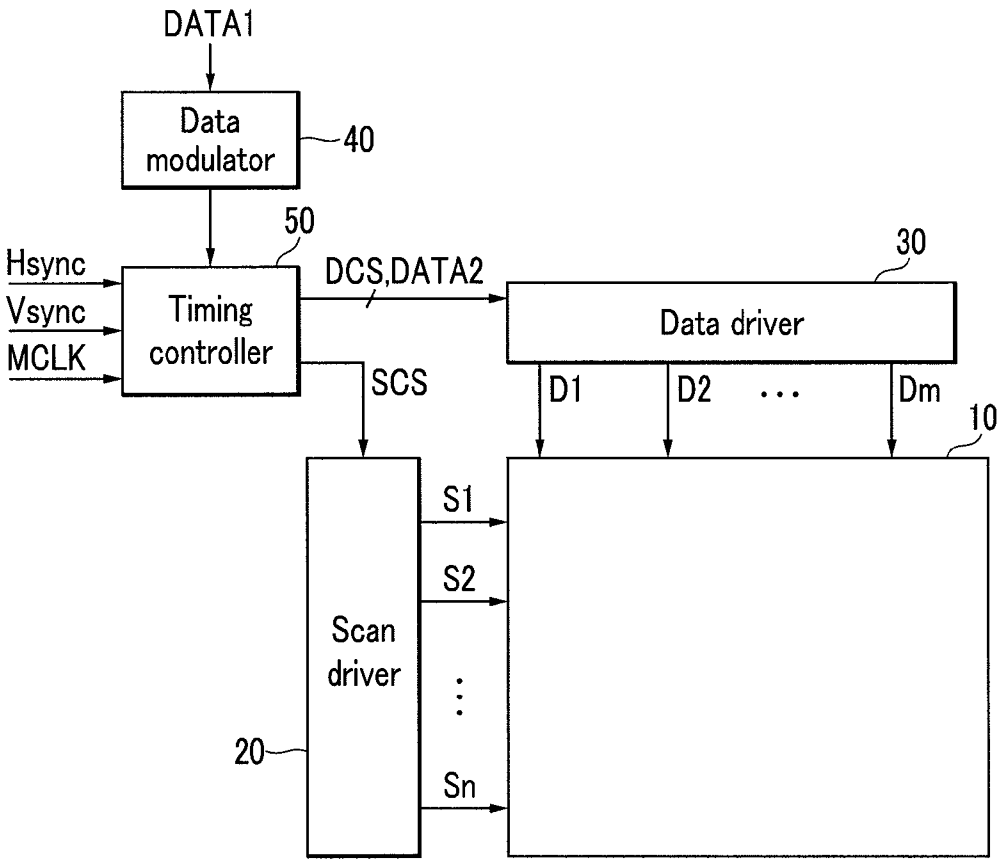
FIG. 1 shows a block diagram of a display device according to an exemplary embodiment.

In the following detailed description, only certain exemplary embodiments are shown and described, simply by way of illustration. As those skilled in the art would realize, the described embodiments may be modified in various ways, without departing from the spirit or scope of the present invention.

Further, some constituent elements having the same or similar configurations described in another exemplary embodiment are generally described using like reference numerals. Generally, only configurations different from those in the first exemplary embodiment will be described in other exemplary embodiments.

Like reference numerals generally designate like elements throughout the specification and drawings.

Throughout this specification, when it is described that an element is "coupled" to another element, the element may be "directly coupled" to the other element or "indirectly coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a block diagram of a display device according to an exemplary embodiment.

The display device has a display 10 including a plurality of pixels, a scan driver 20, a data driver 30, a data modulator 40, and a timing controller 50.

In the exemplary embodiment shown in FIG. 1, the data modulator 40 is separate from the timing controller 50, but other embodiments are restricted thereto, as the data modulator 40 be included in the timing controller 50.

The display 10 includes a plurality of pixels arranged according to a plurality of pixel rows and a plurality of pixel columns.

The scan driver 20 generates and transmits a plurality of scan signals to a plurality of scan lines (S1, S2, . . . , Sn) connected to pixels that are arranged according to the plurality of pixel rows.

The data driver 30 transmits data voltages caused by data signals to a plurality of data lines (D1, D2, . . . , Dm) connected to pixels arranged according to the plurality of pixel columns.

The data signals follow image data signals that are compensated to reduce the motion blur phenomenon by the image processing method according to an exemplary embodiment.

The data modulator 40 receives image data signals (Data1) for each frame, accurately determines where a motion blur could occur in the video, and inserts black data after the frame of the corresponding area to perform compensation. An image processing method for reducing motion blurs in the data modulator 40 is described below with reference to FIG. 2 and FIG. 3.

Image data signals (Data2) are compensated versions of image data signals (Data1), and are transmitted to the data driver 30 through the timing controller 50. That is, the timing controller 50 arranges the respective frame image data signals (Data2) from the data modulator 40 and outputs the arranged data to the data driver 30.

The timing controller 50 generates control signals for controlling drive of the scan driver 20, the data driver 30, and the data modulator 40 with horizontal synchronization signals (Hsync), vertical synchronization signals (Vsync), and clock signals (MCLK). The data drive control signal (DCS) generated by the timing controller 50 is supplied to the data driver 30, and the scan control signal (SCS) is supplied to the scan driver 20. Also, the compensation process for the data modulator 40 to suppress generation of motion blur in the image data signal can be controlled by the timing controller 50.

Figure 2:
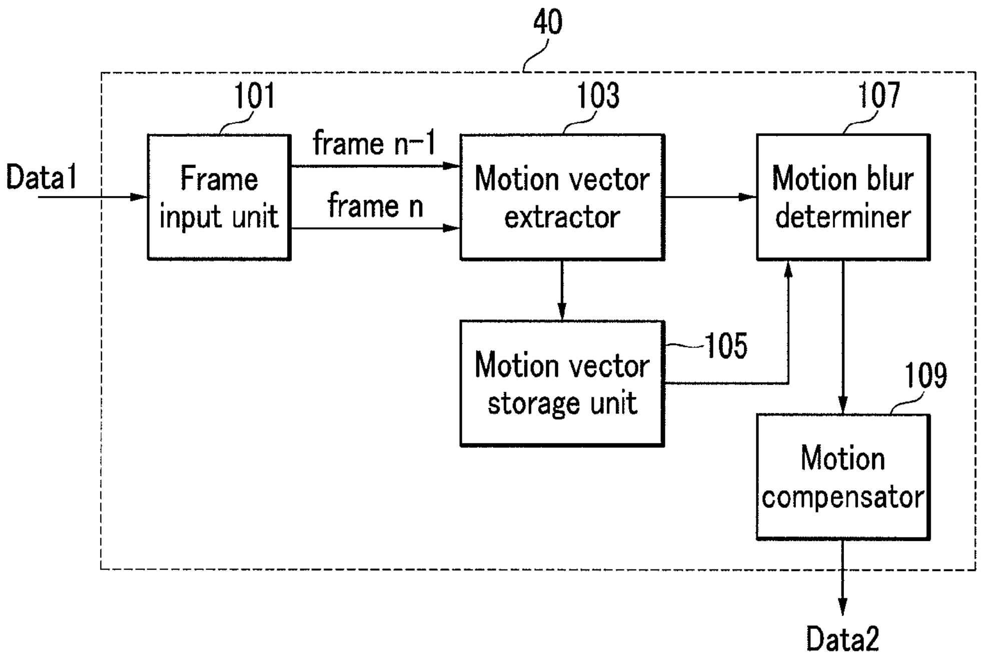
FIG. 2 shows a block diagram of a data modulator shown in FIG. 1 according to an exemplary embodiment.

FIG. 2 shows a block diagram of a data modulator 40 of FIG. 1 according to an exemplary embodiment.

Referring to FIG. 2, the data modulator 40 includes a frame input unit 101, a motion vector extractor 103, a motion vector storage unit 105, a motion blur determiner or detector 107, and a motion compensator 109.

First, the frame input unit 101 receives the image data signals (Data1) for each frame, determines a current frame (frame n) and a previous frame (frame n−1) from the frames of the supplied image data signal (Data1), and provides the frames to the motion vector extractor 103.

The motion vector extractor 103 calculates and extracts a motion vector based on the current frame (frame n) and the previous frame (frame n−1).

The entire image can be divided into a plurality of blocks having a predetermined size before extracting the motion vector so as to find areas having a similar image. The size of the blocks is not restricted, but in some embodiments, the entire image is divided into 8×8 blocks.

The motion vector extractor 103 divides the current frame (frame n) and the previous frame (frame n−1) into a plurality of blocks. The motion vector extractor 103 includes a block searcher which compares a plurality of blocks of the current frame (frame n) and a plurality of blocks of the previous frame (frame n−1), and searches for an image from a plurality of blocks of the previous frame (frame n−1) that is similar to an image of the current frame (frame n).

The similar images from the current frame (frame n) and the previous frame (frame n−1) can be found by calculating difference of image information of respective blocks of the current frame (frame n) and the previous frame (frame n−1) and comparing the differences with a threshold value.

In some embodiments, if the difference value of image information of the respective blocks of the current frame (frame n) and the previous frame (frame n−1) is less than the threshold value, it can be determined to be a similar image.

The search method for finding the similar image while comparing the blocks of the current frame (frame n) and the previous frame (frame n−1) can use existing methods.

In detail, the search method can use a step search algorithm such as the full search algorithm, the 3-step search algorithm, the spiral search algorithm, and the cross search algorithm.

The full search algorithm compares positions of a plurality of blocks of the current frame (frame n) with a plurality of blocks of the previous frame (frame n−1) while moving the positions thereof by at least one pixel.

The 3-step search algorithm reduces the number of pixels moving 3 steps and moves the positions of the blocks of the current frame (frame n) according to the pixel line, and compares the positions with the blocks of the previous frame (frame n−1) for each movement.

The spiral search algorithm outwardly spirally moves the position of blocks of the current frame (frame n) and compares the positions thereof with the blocks of the previous frame (frame n−1).

The cross search algorithm moves positions of the blocks of the current frame (frame n) to the pixel according to an X-type or cross (+) type pattern of four points, and compares the positions thereof with the blocks of the previous frame (frame n−1).

The motion vector extractor 103 also includes a motion vector operator which finds a similar image from the blocks of the previous frame (frame n−1) for each block of the current frame (frame n), and calculates a difference for each position of the image from the corresponding block to extract motion vectors.

In the case of a still image, there will be no difference in the position information of the image in the corresponding block. Also, when a screen is switched to a totally new one, a block including the similar image will not be found. However, in the case of the motion picture with sequential motion, the difference value in position information of the image in the corresponding blocks can be found.

The difference value for position information corresponding to the similar image found in the blocks of the current frame (frame n) and the previous frame (frame n−1) can be defined as a motion vector.

The motion vector can be expressed with the coordinate value (p, q) with the position variation p of the x axis and position variation q of the y axis.

The motion vector extractor 103 extracts a plurality of motion vectors from a plurality of frames sequentially input through the frame input unit 101 through the above-noted process.

The motion vectors for a plurality of frames are stored in the motion vector storage unit 105.

Next, the motion blur determiner 107 determines whether a motion blur phenomenon occurs from the motion vectors found by the motion vector extractor 103.

In some embodiments, the motion blur determiner 107 calculates a ratio of the area having the same motion vector to the area having a similar image as the previous frame (frame n−1).

For example, when an area in the current frame having a similar image as that in the previous is 100 and a portion of the area having the same extracted motion vector of (p, q) is 80, the area ratio is about 80%.

The range of area ratios resulting in motion blur is found experimentally to determine a blur ratio range. If the calculated area ratio is within the blur ratio range, motion blur occurs in the video.

The blur ratio range can be identified as the range of area ratios for which the motion blur phenomenon occurs in the video. The motion blur may be global motion blur, a local motion blur, or a caption motion blur.

The caption area in the video may be especially susceptible to the motion blur phenomenon, particularly if the area ratio of the area with the same motion vector is low. In some embodiments, the motion block determiner 170 determines that the caption is in the motion blur state when the area ratio of the area having the same motion vector is less than a threshold, for example about 40%.

In some embodiments, the blur ratio range for determining a global motion blur can be determined, for example, as an area ratio of greater than about 80%. In addition, the blur ratio range for determining a local motion blur can be determined to be an area ratio between about 40% and about 80%.

When most of the image does not have the same motion and an important part of the image has a specific motion, human eyes naturally follow the specific motion and thus a motion blur can occur. In addition, when areas having the same motion vector are gathered together as a group, the motion blur likely occurs where the area ratio is relatively low (e.g., about 40% to about 80%). The local motion blur represents the motion blur state in such area.

The cited ranges of the blur ratios are examples, but are not limited thereto.

When the motion blur determiner 107 determines that an area in which motion blur can occur, the motion compensator 109 inserts black data for compensating the motion blur in the current frame to thereby perform a compensation process.

In the exemplary embodiment, motion blur compensation for the entire video of a plurality of frames is optionally not applied, and instead, the black data are inserted by the motion compensator 109 only into specific areas where motion blur is expected to occur.

The motion compensator 109 generates the compensated current frame by inserting black data after the current frame (frame n) in the area that is determined to have motion blur. The motion compensator 109 generates an image data signal (Data2) which is compensated image data from image data signal (Data1).

The period for inserting the black data is not limited. In some embodiments, the black data period is half the sustain period of the frame.

Therefore, the image displayed for each frame generally includes an area into which no black data are inserted, and an area that is estimated to generate motion blur. In some embodiments, the area estimated to generate motion blur emits light for only half the sustain period and displays a black image for the other half because the inserted black data.

If motion blur is reduced by inserting black data for a portion of one frame, flicker can be caused, and the light emitting element may have reduced reliability. The luminance of the light emitting elements deteriorate quicker when the black data are inserted.

Figure 3:
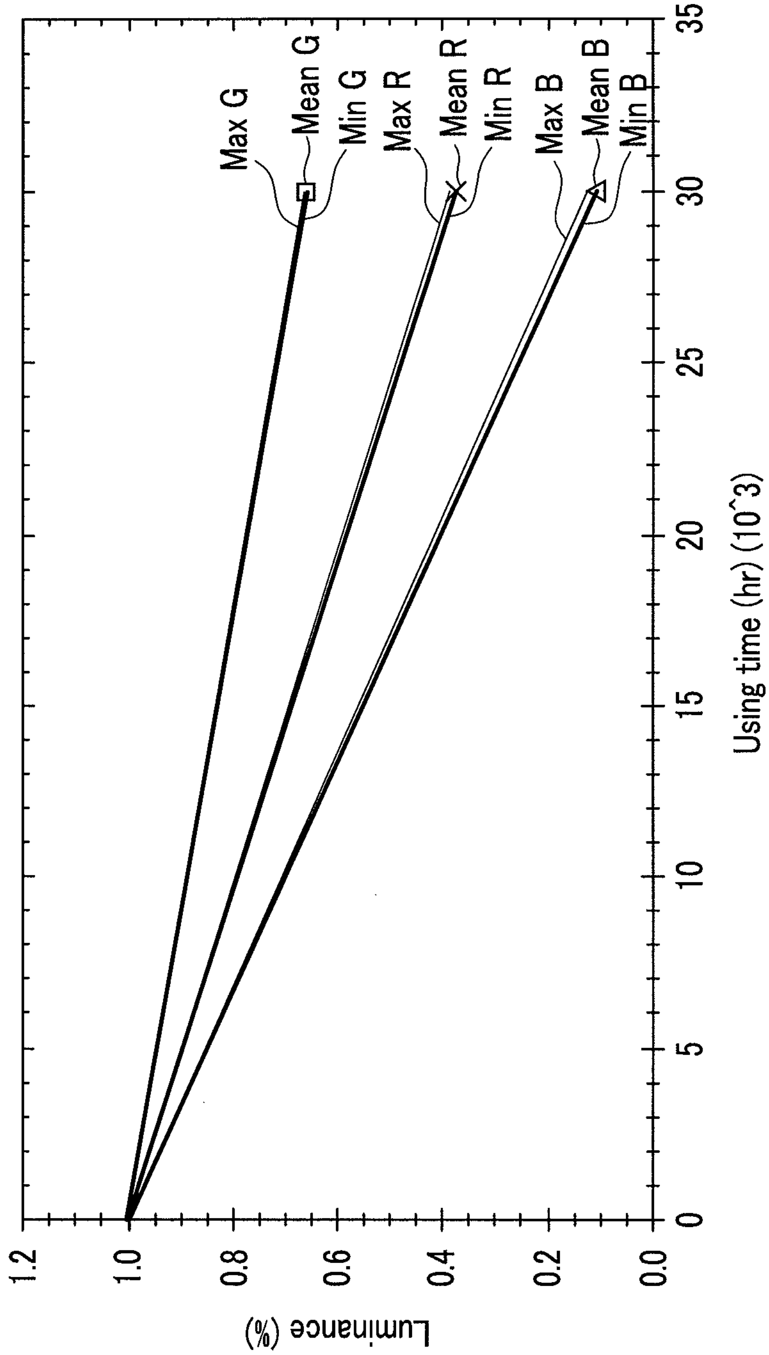
FIG. 3 shows a graph of luminance deterioration by use time in a display device to which insertion of black data is not applied.
Figure 4:
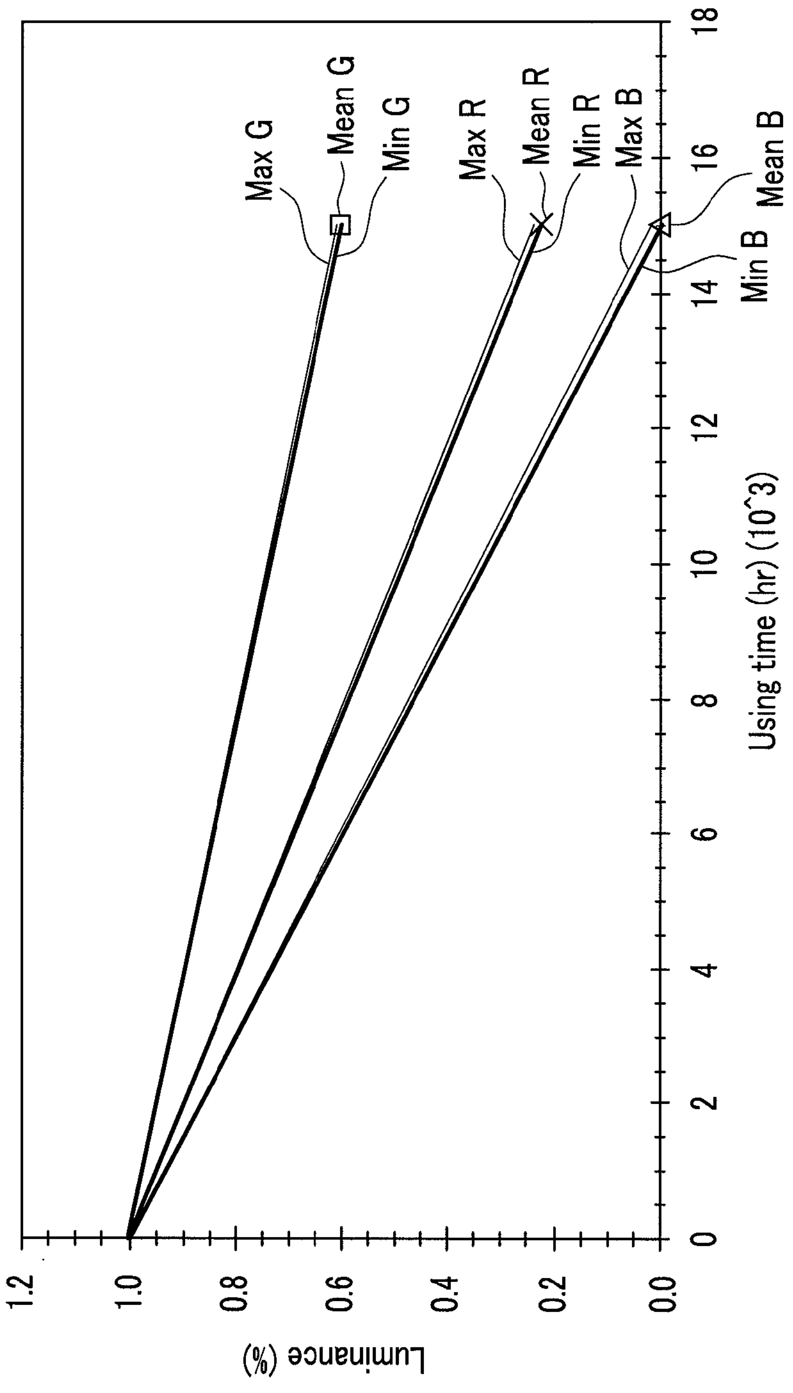
FIG. 4 shows a graph of luminance deterioration by use time in a display device to which insertion of black data is applied.

Deterioration of the light emitting elements when the black data are and are not inserted is shown in the graphs of FIG. 3 and FIG. 4.

FIG. 3 shows a graph of luminance over time in a display device in which insertion of black data is not applied, and FIG. 4 shows a graph of luminance over time in a display device in which insertion of black data is applied.

The x axis of the graph shown in FIG. 3 and FIG. 4 indicates the use time of the display device. The y axis of the graphs shown in FIG. 3 and FIG. 4 shows normalized luminance of the display screen. FIG. 3 and FIG. 4 show life-span deterioration for a full white image.

Referring to FIG. 3, after the full white image emits light for 30,000 hours with no black data inserted into the full white image, luminance of the red signal (R) is reduced to 23%, luminance of the green signal (G) is reduced to 66%, and luminance of the blue signal (B) is reduced to 11%.

Referring to FIG. 4, after the full white image emits light for 15,000 hours with black data inserted into the full white image, luminance of the red signal (R) is reduced to 23%, luminance of the green signal (G) is reduced to 60%, and luminance of the blue signal (B) is reduced to 0%.

Therefore, the display device of FIG. 4 shows deterioration that is similar to the deterioration of the display device of FIG. 3 in half the time. That is, when the black data are inserted, life-span of the light emitting element of the display device is reduced. The image processing method according to the embodiment discussed above have been proposed in consideration of the luminance deterioration problem.

According to the image processing method of the display device for determining the area in which a motion blur will occur and inserting the black data into the corresponding area, the motion blur is reduced, flickering is improved, and the stress of the light emitting element is reduced to suppress reduction of life-span.

Figure 5:
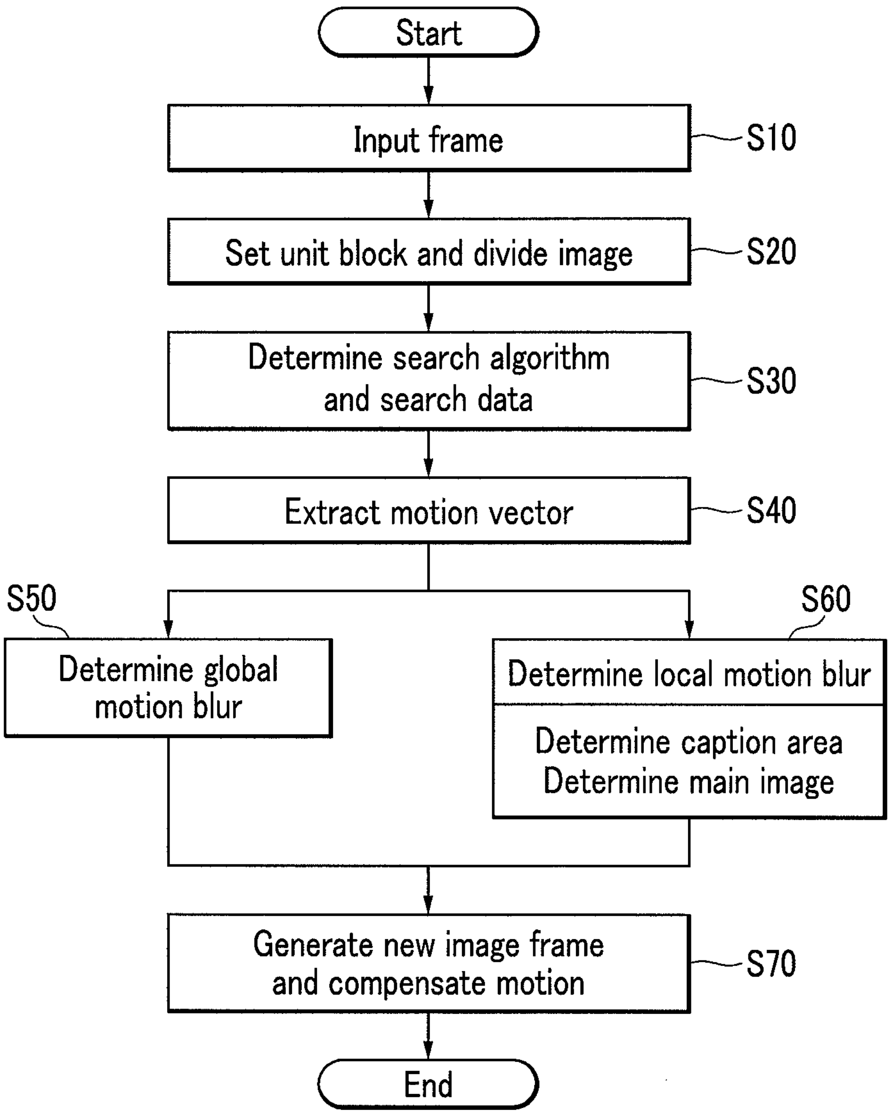
FIG. 5 shows a flowchart of an image processing method of a display device according to an exemplary embodiment.

FIG. 5 shows a flowchart of an image processing method of a display device according to an exemplary embodiment.

The image processing process of FIG. 5 is performed by the data modulator 40 of the display device of FIG. 1.

An image data signal (Data1) is supplied for each frame. That is, consecutive frames of data are input to the data modulator 40 (S10).

The display 10 is divided into a plurality of blocks in order to estimate motion blur areas based on the data of the input current frame and the previous frame. For this purpose, the sizes of the block may be predefined, and the entire image is divided into a plurality of blocks (S20).

Next, a plurality of blocks of the current frame and a plurality of blocks of the previous frame are respectively compared to match and search blocks to find similar images. For this purpose, a match method can be determined from various search algorithms (S30).

It is possible to define a signal to be video when an average difference of image data values of a current frame and the previous frame is greater than a predetermined value. However, with this method screen switching of still images is defined as video. Also, because motion blur occurs when the overall image or portions of the image moves at a specific speed or the caption moves, a large difference between the image data values of the two frames may not occur. That is, it is difficult to accurately determine that the input data is video by using the method.

In some embodiments, a screen is divided into a plurality of blocks, the blocks between two frames are compared to find a similar image, and it is determined whether the blocks generate motion blur by using the processing methods discussed above. As a result, an accurate motion blur condition can be predicted.

When a location having a similar image is found by comparing blocks of the current frame and the previous frame, a plurality of motion vectors are extracted for the location (S40).

Whether a motion blur will occur in the location is determined by using the motion vectors (S50) and (S60).

In some embodiments, based on the motion vectors, the area of the locations having the same motion vector are calculated to determine the motion blur state based on the blur area ratio, as discussed above. The present invention is not restricted thereto, however, and a plurality of motion vector analysis methods can be used to determine expected motion blur.

As described above, motion blur may include any of global motion blur (S50), local motion blur, and caption motion blur (S60). The type of motion blur may be determined based on the area ratio, as discussed above, for example.

Once motion blur is expected, black data is inserted into the area where motion blur is expected. Accordingly, corrected or compensated image data signal (Data2) is generated.

The various data processing and algorithmic procedures and steps discussed above can be implemented in software, firmware, hardware, or any combination thereof. For example, a general purpose processor, may be used to manipulate data as described above to generate an image on a display device.

While various embodiments have been described in connection with certain examples, it is to be understood that the invention is not limited to the disclosed embodiments, but, on the contrary, is intended to include various modifications and equivalent arrangements. Also, the material of respective constituent elements described in the specification can be easily selected and substituted from various materials by a person of ordinary skill in the art. Further, a person of ordinary skill in the art can omit one or more of the constituent elements described in the specification without deterioration of performance or can add constituent elements for better performance. In addition, a person of ordinary skill in the art can make modifications depending on the process conditions or equipment.

What is claimed is:

1. A display device, comprising:

a frame input unit configured to receive a plurality of consecutive frames of image data;

a motion vector extractor configured to calculate a plurality of motion vectors based on a difference between image data of a current frame and a previous frame;

a motion blur detector configured to determine an area ratio for an area of image data based on the motion vectors, and to determine that motion blur is expected in the area of image data based on the area ratio; and a motion compensator configured to compensate for the expected motion blur in the determined area by inserting black data in the determined area in the current frame data of the determined area, wherein the motion blur detector determines one of a global motion blur, a local motion blur, and a caption motion blur according to the blur area ratio, wherein the motion blur is determined to be a global motion blur if the area ratio is greater than a first threshold, a local motion blur if the area ratio is greater than a second threshold and less than a third threshold, and a caption motion blur if the area ratio is less than a fourth threshold.

2. The display device of claim 1, wherein each of the plurality of frames is divided into a plurality of blocks of a predetermined size, and the determined area includes at least one block with an image of the current frame which is similar to an image of the previous frame.

3. The display device of claim 1, wherein the motion vector extractor comprises:

a block searcher configured to divide each frame into a plurality of blocks, to compare blocks of the current frame with blocks of the previous frame, and to search for and find blocks which are similar in both the current and the previous frame; and a motion vector operator configured to calculate differences of image positions between the current frame and the previous frame in similar blocks, and to calculate a plurality of motion vectors based on the differences of image positions.

4. The display device of claim 3, wherein the block searcher is configured to search a search range for the block searcher to search for the similar blocks, wherein the search range includes a predetermined number of pixels.

5. The display device of claim 3, wherein the block searcher is configured to search for the blocks according to a search algorithm.

6. The display device of claim 1, wherein the display device further comprises a motion vector storage unit configured to store the plurality of motion vectors.

7. The display device of claim 1, wherein the area ratio comprises a ratio of an area having the same motion vector to an area having similar images in current and previous frames.

8. The display device of claim 1, wherein the motion compensator is configured to compensate for the expected motion blur in the determined area by inserting black data only in the determined area in the current frame data of the determined area.

9. An image processing method for a display device, comprising:

comparing image data of a current frame and image data of a previous frame of a plurality of consecutive frames;

calculating a plurality of motion vectors based on a difference between image data of the current frame and the previous frame;

determining an area ratio for image data of an area based on the motion vectors;

determining that motion blur is expected in the image data of the area based on the area ratio; and compensating for the expected motion blur in the determined area by inserting black data in the determined area after the current frame data of the determined area, the motion blur is determined as one of a global motion blur, a local motion blur, and a caption motion blur, wherein the motion blur is determined to be a global motion blur if the area ratio is greater than a first threshold, a local motion blur if the area ratio is greater than a second threshold and less than a third threshold, and a caption motion blur if the area ratio is less than a fourth threshold.

10. The image processing method of claim 9, wherein the area comprises at least one block having an image of the current frame which is similar to an image of the previous frame.

11. The image processing method of claim 9, further comprising:

dividing the image data each frame into a plurality of blocks to compare blocks of the current frame with blocks of the previous frame;

determining a search algorithm;

searching for and finding blocks which are similar in both the current and the previous frame according to the search algorithm; and calculating differences of image positions between the current frame and the previous frame in similar blocks, and to calculate a plurality of motion vectors based on the differences of image positions.

12. The image processing method of claim 11, wherein each of the blocks has a size and a predetermined number of pixels.

13. The image processing method of claim 11, wherein determining similar blocks includes determining that a difference between image data of similar current and previous blocks is less than the threshold.

14. The image processing method of claim 9, wherein determining that motion blur is expected in the image data of the area comprises determining that the area ratio is greater than a threshold.

15. The image processing method of claim 9, wherein determining that motion blur is expected in the image data of the area comprises:

calculating the area ratio for the area, wherein the motion vectors for the area are the same;

comparing the area ratio with a threshold; and wherein the motion blur is determined according to the area ratio of the area in which the plurality of motion vectors are the same.

16. The image processing method of claim 9, wherein the area ratio comprises a ratio of an area having the same motion vector to an area having similar images in current and previous frames.

17. The image processing method of claim 9, further comprising compensating for the expected motion blur in the area by inserting black data only in the image data of the area after the image data of the area.

* * * * *